US012802033B2

(12) United States Patent
Kemp

(10) Patent No.: US 12,802,033 B2
(45) Date of Patent: Nov. 17, 2026

(54) INVENTORY MANAGEMENT SYSTEM

(71) Applicant: LC Investment Holdings, LLC, Hartland, WI (US)

(72) Inventor: Elizabeth Kemp, Oconomowoc, WI (US)

(73) Assignee: LC INVESTMENT HOLDINGS, LLC, Hartland, WI (US)

( * ) Notice: Subject to any disclaimer, the term of this patent is extended or adjusted under 35 U.S.C. 154(b) by 23 days.

(21) Appl. No.: 19/256,689

(22) Filed: Jul. 1, 2025

(65) Prior Publication Data

US 2025/0328860 A1 Oct. 23, 2025

Related U.S. Application Data

(62) Division of application No. 18/084,357, filed on Dec. 19, 2022, now Pat. No. 12,373,778.

(51) Int. Cl.

| | |
|---|---|
| ***G06Q 10/087*** | (2023.01) |
| ***B65D 88/12*** | (2006.01) |
| ***B65D 90/00*** | (2006.01) |
| ***B65D 90/48*** | (2006.01) |

(52) U.S. Cl.

CPC ......... *G06Q 10/087* (2013.01); *B65D 88/121* (2013.01); *B65D 90/008* (2013.01); *B65D 90/48* (2013.01); *B65D 2590/0083* (2013.01)

(58) Field of Classification Search

CPC ........... G06Q 10/087; G06Q 10/08776; G06Q 10/08778; G06Q 10/0833; B65D 88/121; B65D 90/008; B65D 90/48; B65D 2590/0083

USPC ............................................................ 705/28

See application file for complete search history.

(56) References Cited

U.S. PATENT DOCUMENTS

| | | | | |
|---|---|---|---|---|
| 7,038,585 | B2 | 5/2006 | Hall et al. | |
| 9,704,000 | B2 | 7/2017 | Pleshek et al. | |
| 10,592,861 | B2 | 3/2020 | Kemp | |
| 2009/0146832 | A1 * | 6/2009 | Ebert | H04L 67/12 340/8.1 |
| 2018/0225625 | A1 * | 8/2018 | DiFatta | G06Q 10/087 |
| 2023/0209022 | A1 * | 6/2023 | Bashkin | G07C 9/00896 705/28 |
| 2023/0377083 | A1 * | 11/2023 | Lowry | G06Q 20/14 |

* cited by examiner

*Primary Examiner* — Garcia Ade

(74) *Attorney, Agent, or Firm* — Donald J. Ersler

(57) ABSTRACT

An inventory monitoring system preferably includes a computer monitoring device and a plurality of containers. The computer monitoring device includes a computer, a software a transceiver and a display device. The software program preferably includes compliance tracking, event reporting replacement alerts, video training, log generation, remote inventory checking of each storage box, a list of items to be order for the next year and supplying regulator alerts. Each container preferably includes a storage box, a box transceiver, a microcontroller, a battery, a location sensor, an opening and closing sensor, an item tracking sensor, at least one identity monitoring device, a temperature sensor, a humidity sensor and a low battery indicator. A plurality of items are stored in the plurality of containers. The storage box preferably includes a locking cover. The microcontroller will also periodically test all sensors connected thereto.

20 Claims, 3 Drawing Sheets

INVENTORY MANAGEMENT SYSTEM

CROSS REFERENCE TO RELATED APPLICATIONS

This is a divisional patent application which takes priority from patent application Ser. No. 18/084,357, filed on Dec. 19, 2022, which is thereby incorporated by reference in its entirety.

BACKGROUND OF THE INVENTION

1. Field of the Invention

The present invention relates generally to management of items, and more specifically to an inventory management system, which tracks items removed or added to a plurality of containers.

2. Discussion of the Prior Art

Critical items frequently have the necessity of being stored in a secure container. It would be useful to track when the critical items are removed or added to the secure container. U.S. Pat. No. 7,038,585 to Hall et al. discloses a cargo lock and monitoring apparatus and process. U.S. Pat. No. 9,704,000 to Pleshek et al. discloses a mobile RFID container and distribution method. U.S. Pat. No. 10,592,861 to Kemp discloses an active shooter response system for initiating silent alert and deploying tactical tools.

Accordingly, there is clearly felt need in the art for an inventory management system, which tracks items removed or added to a plurality of containers.

SUMMARY OF THE INVENTION

The present invention provides an inventory management system, which tracks items removed or added to a plurality of containers. The inventory management system preferably includes a computer monitoring device and a plurality of containers. The computer monitoring device includes a suitable computer, a monitoring software program (software program), a transceiver and a display device. The software program preferably includes compliance tracking, event reporting replacement alerts, video training, reporting, log generation, remote inventory checking of each storage box, a list of items to be ordered for the next year and supplying regulator alerts. It is preferable that the software program be capable of wireless updates. Event reporting occurs when the storage box is opened; the storage box is closed; items are removed from the storage box; items are inserted into to the storage box; the storage box is moved; or any event related to the storage box. After the storage box is closed, a microcontroller will inventory all the tagged items in the storage box and send an inventory list to the software program. The inventory list could be sent to a responsible individual to place an order for missing items, or items that are near their expiration date. The software program provides links to training videos for how to use each item in the storage box, and also reality training for how to react to a particular scenario. For example, how to apply a tourniquet. The logs are generated when the storage box is opened; the storage box is closed; the storage box is moved; items are removed from the storage box; and items are inserted into the storage box. The logs also supply the items contained in each storage box. All information in the computer is accessible through the display device.

The regulatory alerts are monitored by the software program to ensure compliance with regulations or regulatory compliance. The software program is capable of sending a maintenance notice concerning a storage box for some maintenance issue to be implemented. The computer could be made portable, such as locating thereof in a vehicle. The software monitoring program is installed on the computer. The transceiver is connected to the input and output ports of the computer.

Each container preferably includes a storage box, a box transceiver, a microcontroller, a battery, a location sensor, an opening and closing sensor, an item tracking sensor, a plurality of tagged items; at least one identity monitoring device, a temperature sensor, a humidity sensor, a cellular sensor and a low battery indicator. The location sensor is preferably tracked through GPS or cellular. The storage box could be a cabinet, a case or any other suitable storage enclosure. A magnet sensor may used for the opening and closing sensor. Wireless communication between the transceiver and the box transceiver is implemented with WIFI, power over Ethernet (POE) or cellular communication between the transceiver and cloud-API. It is preferable that an antenna of the transceiver be located inside or an outside of the storage box. A second antenna may be necessary if the tagged tagged items in the storage box are located to close to each other. The storage box preferably includes a locking cover. However, the storage box could be integrated into a secondary container, such as a cargo container. The cover may be locked with a key lock, a combination lock, a microcontroller-controlled combination lock, an eye scan, finger print reader, slide card, or any other suitable lock. The microcontroller is retained in the storage box. The box transceiver is located in the storage box and connected to the microcontroller. The microcontroller or box transceiver should be able to store data on an SD card when a connection is lost. The data on the SD card should be able to be deleted remotely.

The location sensor is connected to the microcontroller to periodically transmit a location of the storage box. The opening and closing sensor is also connected to the microcontroller. The opening and closing sensor sends a signal to the computer, when the cover is opened or closed. However, a transmitter could be used instead of the box transceiver, if receiving data is not necessary. The microcontroller will also periodically test all sensors connected thereto. A report will be sent to the software program of the status of the sensors and events.

An expiration date of items (if needed by an item) in each container is tracked by the software monitoring program. A tracking device is attached to each item that may have an expiration date. For example, pills may be placed in a sleeve and the sleeve tagged. The tracking device could be a lower power RFID tag. However, it is preferable that tracking device be Bluetooth low energy (BLE) or ultra-wide ban (UWB). The item tracking sensor is connected to the microcontroller and will sense when one of the items is removed from the storage box and transmit a message to the computer through the transceiver. However, the storage box could be hard wired to the microcontroller. A battery monitoring system may be used to monitor the charge of the battery. The low charge condition of the battery would be transmitted to the computer. It is preferable that the battery be rechargeable and replaceable. The at least one identity monitoring device includes a camera, a facial recognition device, a fingerprint reading device and a special log in by a card reader. It is preferable that the electronic components in the storage box operate on a low power mode when the cover is closed and are supplied with full power when the cover is opened. The camera may be mounted inside or outside the storage box.

Accordingly, it is an object of the present invention to provide an inventory management system, which tracks items removed or added to a plurality of containers.

These and additional objects, advantages, features and benefits of the present invention will become apparent from the following specification.

DETAILED DESCRIPTION OF THE PREFERRED EMBODIMENTS

Figure 1:
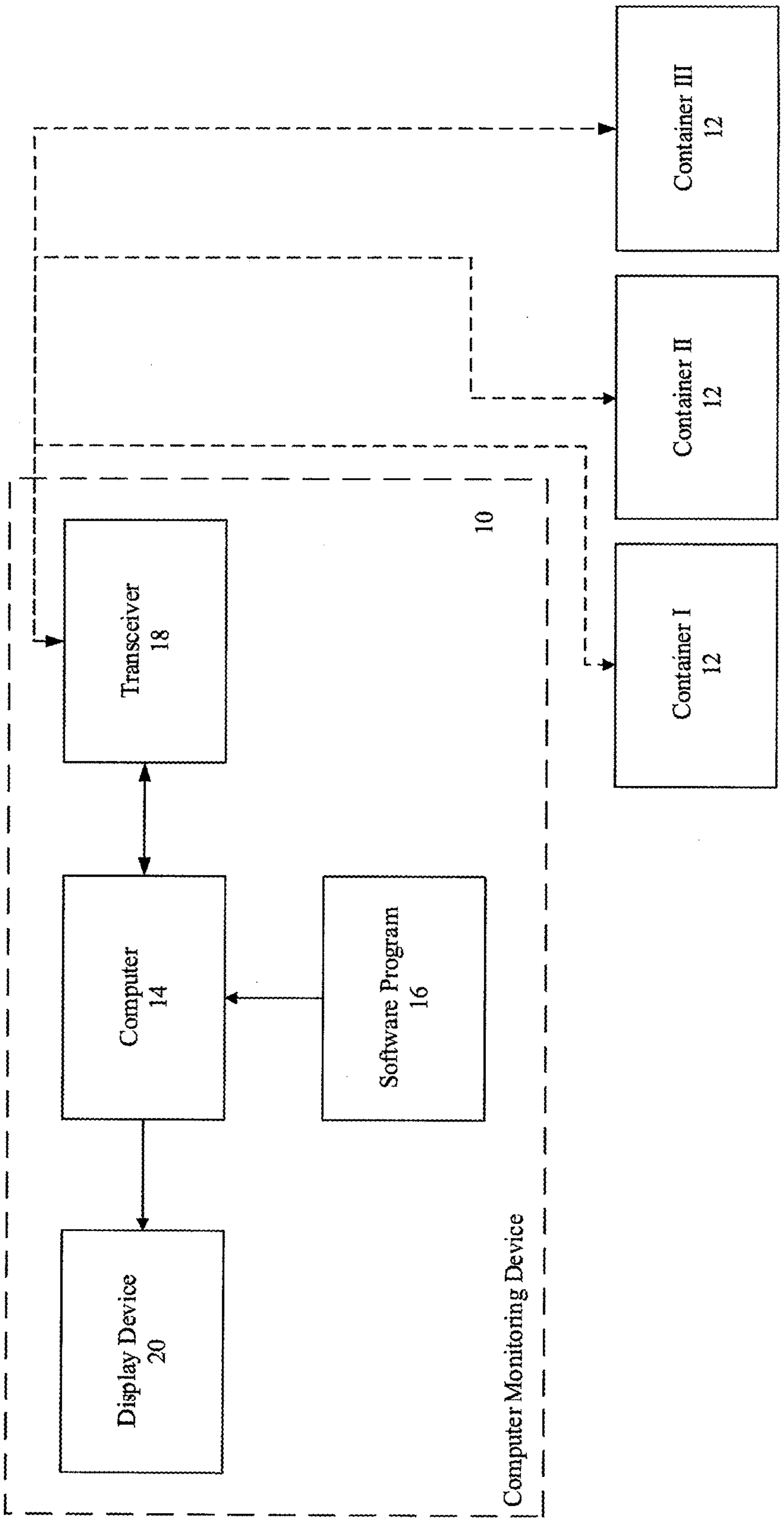
FIG. 1 is a schematic diagram of an inventory monitoring system in accordance with the present invention.
Figure 2:
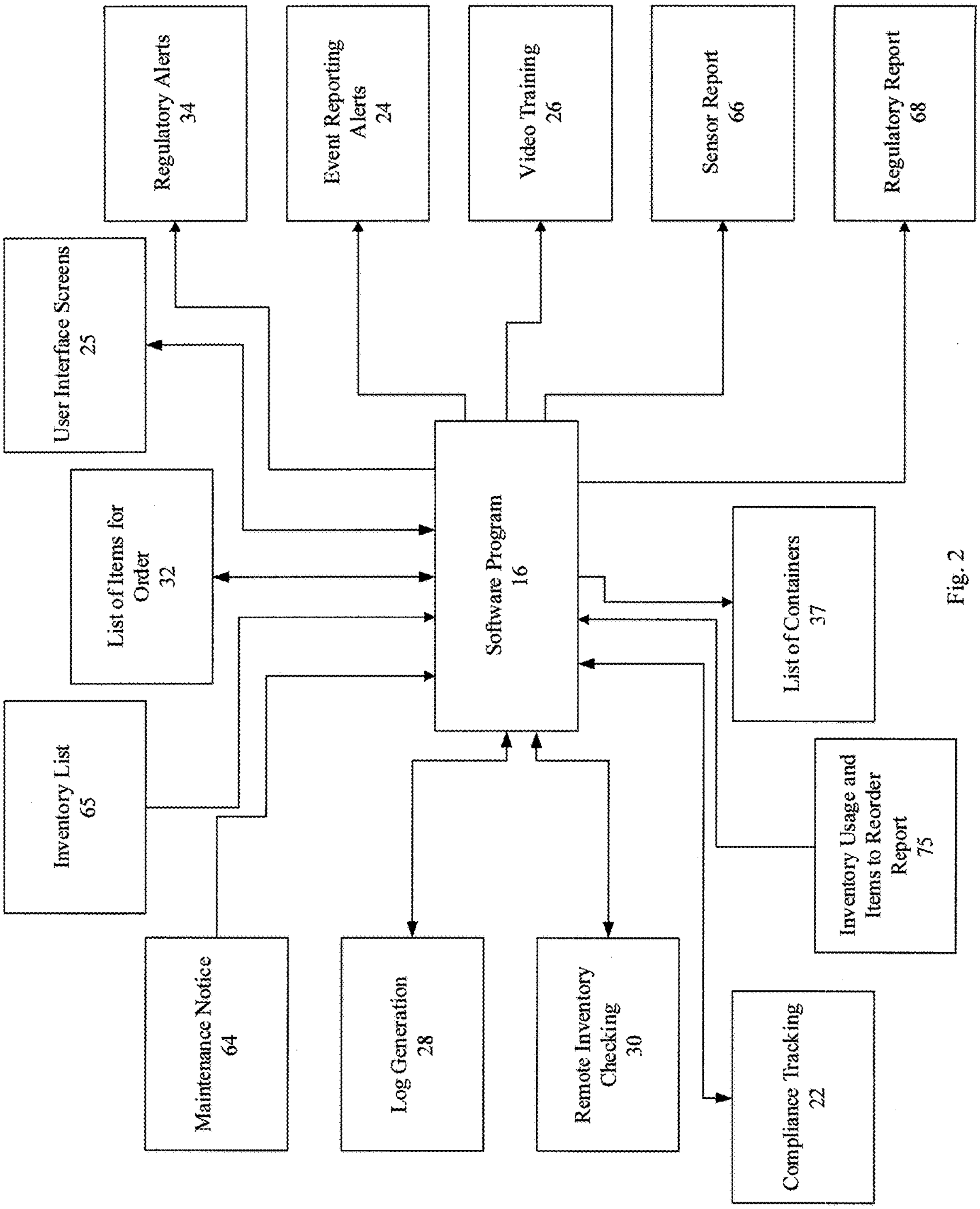
FIG. 2 is a schematic diagram of a software program of an inventory monitoring system in accordance with the present invention.

With reference now to the drawings, and particularly to FIG. 1, there is shown an inventory monitoring system 1. The inventory monitoring system 1 preferably includes a computer monitoring device 10 and a plurality of containers 12. The computer monitoring device 10 preferably includes a suitable computer 14, a monitoring software program (software program) 16, a transceiver 18 and a display device 20. With reference to FIG. 2, the software program 16 preferably includes compliance tracking 22, event reporting replacement alerts 24, video training 26, log generation 28, remote inventory checking of each storage box 30, a list of items to be ordered for the next year 32, supplying regulator alerts 34, recent event history 35 and a list of the plurality of containers (list of containers) 37. It is preferable that the software program 16 be capable of wireless updates. The computer 14 could be made portable, such as locating thereof in a vehicle. The software program 16 is installed on the computer. The transceiver 18 is connected to the input and output ports of the computer 16. However, the connection between some or all of the plurality of containers 12 and computer monitoring device 10 may be hard wired.

All information in the computer 14 is accessible through the display device 20. The software program 16 includes an user interactive screen 25, which provides links for displaying the compliance tracking 22, the event reporting replacement alerts 24, the video training 26, the log generation 28, the remote inventory checking of each storage box 30, the list of items to be ordered for the next year 32, supplying regulator alerts 34, the recent event history 35 and the list of containers 37 on the display device 20.

Figure 3:
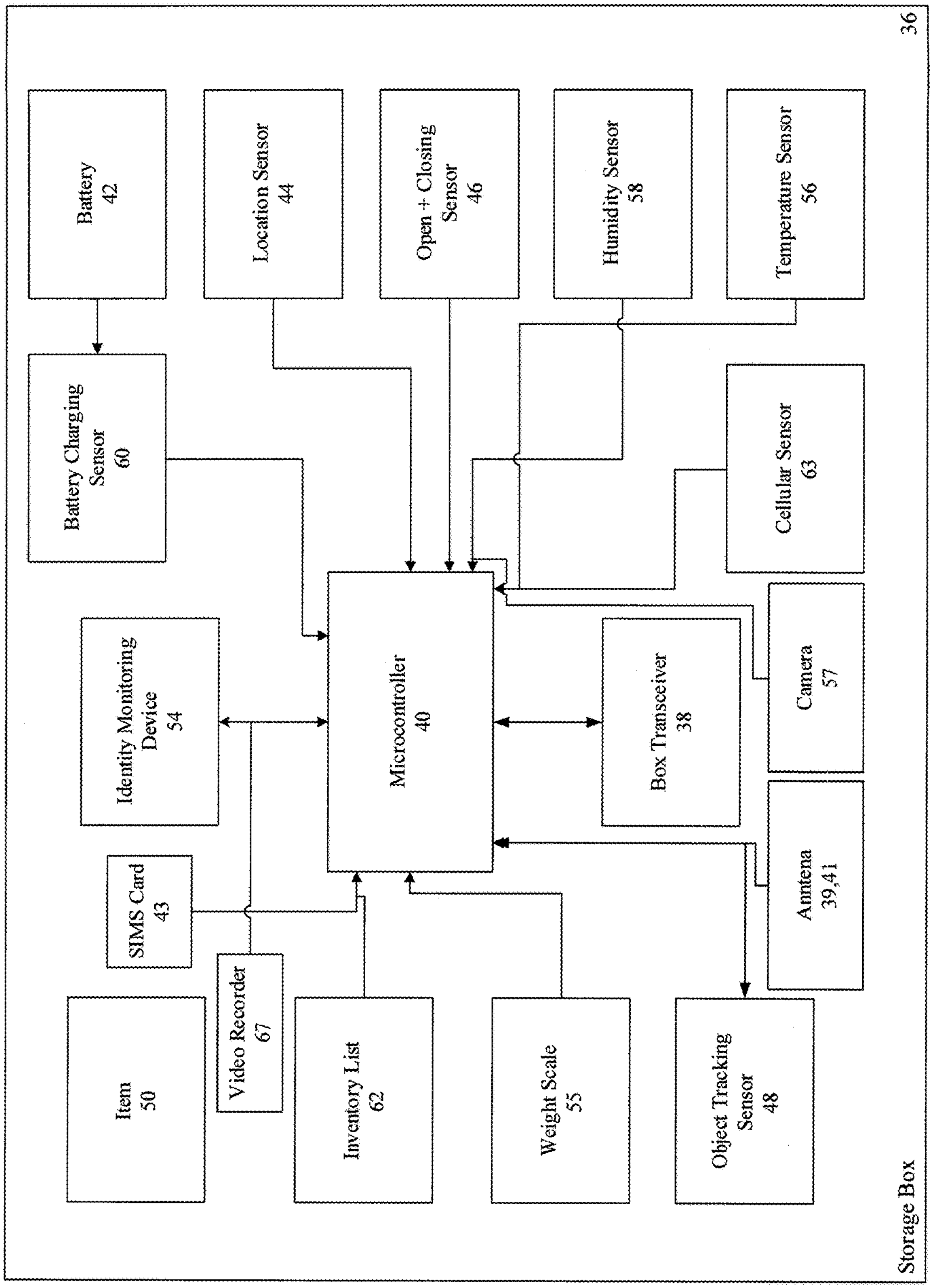
FIG. 3 is a schematic diagram of a container of an inventory monitoring system in accordance with the present invention.

With reference to FIG. 3, each container preferably includes a storage box 36, a box transceiver 38, a microcontroller 40, a battery 42, a location sensor 44, an opening and closing sensor 46, an item tracking sensor 48, at least one identity monitoring device 54, a weight scale 55, a temperature sensor 56, a humidity sensor 58, a battery charge sensor 60 and a cellular sensor 63. A plurality of items 50 are retained in the storage box 36. Event reporting alerts 24 occur when the storage box 36 is opened; the storage box 36 is closed; items are removed from the storage box 36; items are added to the storage box 36; the storage box is moved 36; or any event related to the storage box 36. After the storage box 36 is closed, the microcontroller 40 will inventory all tagged items 50, 52 in the storage box 36 and will generate an inventory list 62, which is sent to the software program 16. Alternatively, the software program 16 will keep track of all the items 50, 52 added and removed from the storage box 36 and generate an inventor list 65. The inventory list 62, 65 could be emailed to a responsible individual to place an order for missing items or items that are near their expiration date. An order to replenish items is preferably linked to each particular container and upon receipt of the ordered items. A video recorder 67 is preferably connected to the microcontroller 40.

The software program 16 provides links to the training videos 26 for how to use items 50, 52 in the storage box 36, and also reality training for how to react to a particular scenario. For example, how to apply Cobra Cuffs for restraining an individual.

It is preferable to track logged-in users who access each video. The logs 28 are generated when the storage box 36 is opened; the storage box 36 is closed; the storage box 36 is moved; items 50, 52 are removed from the storage box 36; and items are inserted into the storage box 36. The logs 28 also supply the items contained in each storage box. The regulatory alerts 34 are monitored by the software program 16 to ensure compliance with government regulations and regulatory compliance.

The software program 16 is capable of sending a maintenance notice 64 concerning a storage box 36 for some maintenance issue to be implemented. The list of containers 37 provides each container of the plurality of containers 12. Each listed container includes a link, which may be clicked on to provide current contents; the UDI; type; organization, department or assignment; physical location; at least one photograph thereof and status of that particular container. Each item in the current contents may be clicked on to display lot numbers and expiration dates. Event history for each container may also be obtained by clicking on a link.

The storage box 12 could be a cabinet, a case or any other suitable storage enclosure. A magnet type sensor or similar device may be used for the opening and closing sensor 46. Wireless communication between the transceiver 18 and the box transceivers 12 are implemented with WIFI, power over Ethernet (POE) or cellular communication between the transceiver and cloud-API. It is preferable that an antenna 39 of the box transceiver 38 be located inside or outside of the storage box 36. A second antenna 41 may be necessary if the tagged items 50, 52 in the storage box 36 are located to close to each other. The storage box 36 preferably includes a locking cover or locking cover door. However, the storage box 36 could be integrated into a secondary container, such as a cargo container. The cover may be locked with a locking device, such as a key lock, a combination lock, a microcontroller-controlled combination lock, an eye scan, finger print reader, slide card, or any other suitable lock. The microcontroller is retained in the storage box. The box transceiver 38 is located in the storage box 36 and connected to the microcontroller 38. The microcontroller 40 or box transceiver

38 should be able to store data on an SD card when a connection is lost. The data on the SD card should be able to be deleted remotely by the software program 16. A sims card 43 is connected to microcontroller 40 to provide real time updates to the microcontroller 40.

The location sensor 44 is connected to the microcontroller 40 to periodically transmit a location of the container 12.

The opening and closing sensor 46 is also connected to the microcontroller 40. The opening and closing sensor 46 sends a signal to the computer 14, when the cover is opened or closed. However, a transmitter could be used instead of the box transceiver 38, if receiving data is not necessary. The box transceiver 38 and the transmitter are wireless communication devices. The microcontroller 40 will also periodically test all sensors connected thereto for functionality. A sensor report 66 will be sent to the software program 16 concerning the status of the sensors. It is preferable to have regulatory report 68. The regulatory report 68 preferably includes a complete FDA log for each container; a usage report including financial impact; expiring items report for future planning and budgeting; missing items and an order history report. A report for inventory usage and items to be reorder 75 is automatically created by the software program 16.

An expiration date of the items 50 (if needed by an item) in each container 12 is tracked by the software program 16. It is preferable that each item 50 include a tracking device, such as a unique device identifier (UDI) for each item that may have an expiration date. For example, pills may be placed in a sleeve and the sleeve tagged. The tracking device could be a lower power RFID tag. However, it is preferable that tracking device be Bluetooth low energy (BLE) or ultra-wide ban (UWB). The item tracking sensor 48 is connected to the microcontroller 40 and will sense when one of the items 50 is removed from the storage box and transmit a message to the computer 14 through the box transceiver 38. The battery charge sensor 60 may be used to monitor the charge of the battery 42. A low charge condition of the battery 42 would be transmitted to the computer 16. It is preferable that the battery 42 be rechargeable and replaceable. The identity monitoring device 54 preferably includes a camera 57, a facial recognition device, a fingerprint reading device and a special log in by a card reader. The camera 57 may also include an integral video recording device. The weight scale 55 is connected to the microcontroller 40. The weight scale 55 allows items 50 to be weighed and the weight transmitted to the computer 14 for relative measurements and event recording. It is preferable that the electronic components in the storage box 36 operate on a low power mode when the cover is closed and are supplied with full power when the cover is opened. The camera 57 may be mounted inside or outside the storage box 36.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed:

1. An inventory monitoring system, comprising:

a plurality of containers each said container including a wireless communication device, a battery, an opening and closing sensor and an item tracking sensor;

a computer capable of wirelessly communicating with said plurality of containers, said item tracking sensor sends data to said computer concerning items removed from said plurality of containers, wherein any of the items removed from said plurality of containers is automatically reordered; and a software program installed on said computer, said software program receives said data from said plurality of containers, said software program stores a list of the items removed and added to each one of said plurality of containers, wherein said software program provides a report about each one of said plurality of containers when requested by a user.

2. The inventory monitoring system of claim 1, further comprising:

a display device connected to said computer, said display device enables a user to communicate with said software program.

3. The inventory monitoring system of claim 1, wherein: said software program offering access to training videos concerning items stored in said plurality of containers.

4. The inventory monitoring system of claim 1, wherein: said software program generating a report when one of said plurality of containers is opened and when one of said plurality of containers is not closed.

5. The inventory monitoring system of claim 1, wherein: said software program providing a maintenance notice when at least one of said plurality of containers needs maintenance.

6. The inventory monitoring system of claim 1, wherein: said software program providing a sensor report for the plurality of sensors in said plurality of containers.

7. An inventory monitoring system, comprising:

a plurality of containers each said container including a wireless communication device, a battery, an opening and closing sensor and an item tracking sensor, a plurality of items having unique device identifiers are stored in said plurality of containers;

a computer capable of wirelessly communicating with said plurality of containers, said item tracking sensor sends data to said computer concerning the plurality of items removed from said plurality of containers; and a software program installed on said computer, said software program receives said data from said plurality of containers, said software program stores a list of the items removed and added to each one of said plurality of containers, wherein said software program is capable of sending a maintenance notice concerning one of said plurality of storage containers for the implementation of a maintenance issue concerning an item stored in at least one of said plurality of maintenance containers.

8. The inventory monitoring system of claim 7, further comprising:

a display device connected to said computer, said display device enables a user to communicate with said software program.

9. The inventory monitoring system of claim 7, wherein: said software program generating a report when one of said plurality of containers is opened and when one of said plurality of containers is not closed.

10. The inventory monitoring system of claim 7, wherein: said software program checking for updates on regulatory websites and providing an alert concerning new regulations.

11. The inventory monitoring system of claim 7, wherein: a video recorder for recording data concerning one of said plurality of containers.

12. The inventory monitoring system of claim 7, wherein: said software program providing a sensor report for the plurality of sensors in said plurality of containers.

13. The inventory monitoring system of claim 7, wherein: said inventory monitoring system capable of tracking locations of said plurality of containers.

14. An inventory monitoring system, comprising:

a plurality of containers each said container including a wireless communication device, a battery, an opening and closing sensor and an item tracking sensor, a plurality of items having unique device identifiers are stored in said plurality of containers;

a computer capable of wirelessly communicating with said plurality of containers, said item tracking sensor sends data to said computer concerning the plurality of items removed from said plurality of containers; and a software program installed on said computer, said software program receives said data from said plurality of containers, said software program stores a list of the items removed and added to each one of said plurality of containers, wherein said software program monitoring regulatory alerts to ensure at least one item in at least one of said plurality of containers is in compliance with at least one regulation.

15. The inventory monitoring system of claim 14, further comprising:

a display device connected to said computer, said display device enables a user to communicate with said software program.

16. The inventory monitoring system of claim 14, wherein:

said software program generating a report when one of said plurality of containers is opened and when one of said plurality of containers is not closed.

17. The inventory monitoring system of claim 14, wherein:

said software program checking for updates on regulatory websites and providing an alert concerning new regulations.

18. The inventory monitoring system of claim 14, wherein:

a video recorder for recording data concerning one of said plurality of containers.

19. The inventory monitoring system of claim 14, wherein:

said software program providing a sensor report for the plurality of sensors in said plurality of containers.

20. The inventory monitoring system of claim 14, wherein:

said inventory monitoring system capable of tracking locations of said plurality of containers.

* * * * *